(12) United States Patent
Matsumoto

(10) Patent No.: US 10,754,117 B2
(45) Date of Patent: Aug. 25, 2020

(54) JOINED OPTICAL MEMBER

(71) Applicant: FUJIFILM Corporation, Tokyo (JP)

(72) Inventor: Nariya Matsumoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 173 days.

(21) Appl. No.: 15/939,591

(22) Filed: Mar. 29, 2018

(65) Prior Publication Data
US 2018/0217350 A1 Aug. 2, 2018

Related U.S. Application Data

(63) Continuation of application No. PCT/JP2016/067787, filed on Jun. 15, 2016.

(30) Foreign Application Priority Data

Sep. 30, 2015 (JP) .................. 2015-194237

(51) Int. Cl.
*G02B 7/02* (2006.01)
*C03C 27/10* (2006.01)
(Continued)

(52) U.S. Cl.
CPC .............. *G02B 7/02* (2013.01); *C03C 27/10* (2013.01); *G02B 3/02* (2013.01); *G02B 7/025* (2013.01);
(Continued)

(58) Field of Classification Search
None
See application file for complete search history.

(56) References Cited

U.S. PATENT DOCUMENTS

| 2009/0047011 A1 | 2/2009 | Okamoto et al. |
| 2010/0318186 A1* | 12/2010 | Bumbalough ........ A61F 2/1613 623/6.43 |
| 2015/0197074 A1* | 7/2015 | Takahashi ........... B29C 65/1629 428/172 |

FOREIGN PATENT DOCUMENTS

| CN | 1670559 A | 9/2005 |
| CN | 101285923 A | 10/2008 |
(Continued)

OTHER PUBLICATIONS

Chinese Office Action and Search Report, dated Mar. 21, 2019, for corresponding Chinese Application No. 201680055913.0, along with an English translation of the Chinese Office Action.
(Continued)

*Primary Examiner* — William R Alexander
*Assistant Examiner* — Gary W O'Neill
(74) *Attorney, Agent, or Firm* — Birch, Stewart, Kolasch & Birch, LLP

(57) ABSTRACT

A joined optical member 1 includes: a hardly adhesive lens L1 that is formed of a hardly adhesive material; an easily adhesive lens L2 that is formed of a easily adhesive material and is provided parallel to the hardly adhesive lens L1 in an optical axis direction; a bonding member that includes an exposed portion 2a and is embedded in the hardly adhesive lens L1, the exposed portion 2a being exposed to an outer peripheral portion 11 of a facing surface L1a of the hardly adhesive lens L1 that faces the easily adhesive lens L2; and an adhesive 3 that allows the easily adhesive lens L2 and the exposed portion 2a of the bonding member 2 to adhere to each other. The easily adhesive material has higher adhesiveness with the adhesive than the hardly adhesive material.

9 Claims, 8 Drawing Sheets

(51) Int. Cl.
*G02B 3/02* (2006.01)
*G02B 3/00* (2006.01)

(52) U.S. Cl.
CPC .. *G02B 2003/0093* (2013.01); *G02F 2202/28* (2013.01)

(56) References Cited

FOREIGN PATENT DOCUMENTS

| | | |
|---|---|---|
| JP | 62-43316 U | 3/1987 |
| JP | 6-201963 A | 7/1994 |
| JP | 2002-131509 A | 5/2002 |
| JP | 2002-333563 A | 11/2002 |
| JP | 2008-241838 A | 10/2008 |

OTHER PUBLICATIONS

International Preliminary Report on Patentability and Written Opinion of the International Searching Authority (Forms PCT/IB/326, PCT/IB/373 and PCT/ISA/237) dated Apr. 12, 2018, for corresponding International Application No. PCT/JP2016/067787, with an English Translation of the Written Opinion.

International Search Report (Form PCT/ISA/210) dated Sep. 13, 2016, for corresponding International Application No. PCT/JP2016/067787, with an English Translation.

* cited by examiner

JOINED OPTICAL MEMBER

CROSS REFERENCE TO RELATED APPLICATIONS

This is a continuation of International Application No. PCT/JP2016/067787 filed on Jun. 15, 2016, and claims priority from Japanese Patent Application No. 2015-194237 filed on Sep. 30, 2015, the entire disclosures of which are incorporated herein by reference.

BACKGROUND OF THE INVENTION

1. Field of the Invention

The present invention relates to a joined optical member.

2. Description of the Related Art

An optical element holding device disclosed in JP1994-201963A (JP-H6-201963A) includes: a hardly adhesive fluorite lens and an easily adhesive quartz lens; and a lens barrel that accommodates the fluorite lens and the quartz lens. The lens barrel includes a locking portion that locks a surface outer peripheral portion of the fluorite lens. The quartz lens is disposed in the lens barrel to be opposite to the locking portion of the lens barrel with respect to the fluorite lens, and adheres to the lens barrel. The fluorite lens is interposed between the locking portion of the lens barrel and the quartz lens adhering to the lens barrel. As a result, the bonding strength between the hardly adhesive fluorite lens and the quartz lens is improved.

SUMMARY OF THE INVENTION

In the optical element holding device described in JP1994-201963A (JP-H6-201963A), a plurality of lenses joined to each other are accommodated in the lens barrel, and side surfaces of the lenses are covered with the lens barrel. Therefore, due to the lens barrel, the optical element holding device has a large diameter. In addition, since the side surfaces of the lenses are covered with the lens barrel, it is difficult to adjust eccentricity of each of the lenses during centering of the lenses joined to each other.

The present invention has been made in consideration of the above-described circumstances, and an object thereof is to provide a joined optical member in which the diameter can be reduced and in which eccentricity of each of a plurality of optical elements joined to each other can be easily adjusted.

According to an aspect of the present invention, there is provided a joined optical member comprising: a hardly adhesive optical element that is formed of a hardly adhesive material; an easily adhesive optical element that is formed of a easily adhesive material and is provided parallel to the hardly adhesive optical element in an optical axis direction; a bonding member that includes an exposed portion and is embedded in the hardly adhesive optical element, the exposed portion being exposed to an outer peripheral portion of a facing surface of the hardly adhesive optical element that faces the easily adhesive optical element; and an adhesive that allows the easily adhesive optical element and the exposed portion of the bonding member to adhere to each other. The easily adhesive material has higher adhesiveness with the adhesive than the hardly adhesive material.

According to the present invention, it is possible to provide a joined optical member in which the diameter can be reduced and in which eccentricity of each of a plurality of optical elements joined to each other can be easily adjusted.

DESCRIPTION OF THE PREFERRED EMBODIMENTS

Figure 1:
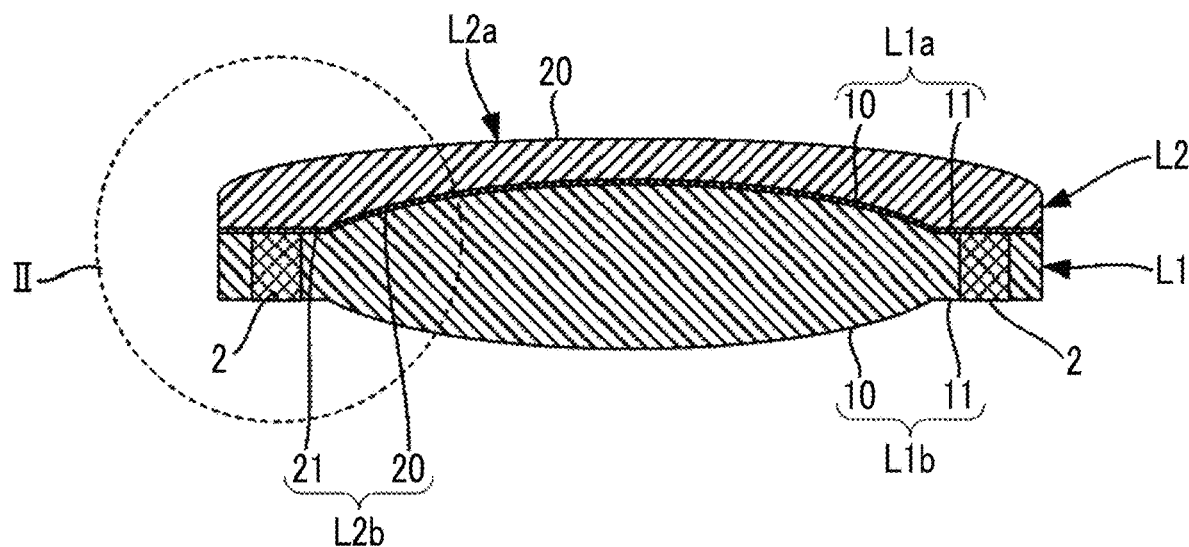
FIG. 1 is a cross-sectional view showing an example of a joined optical member according to an embodiment of the present invention.
Figure 2:
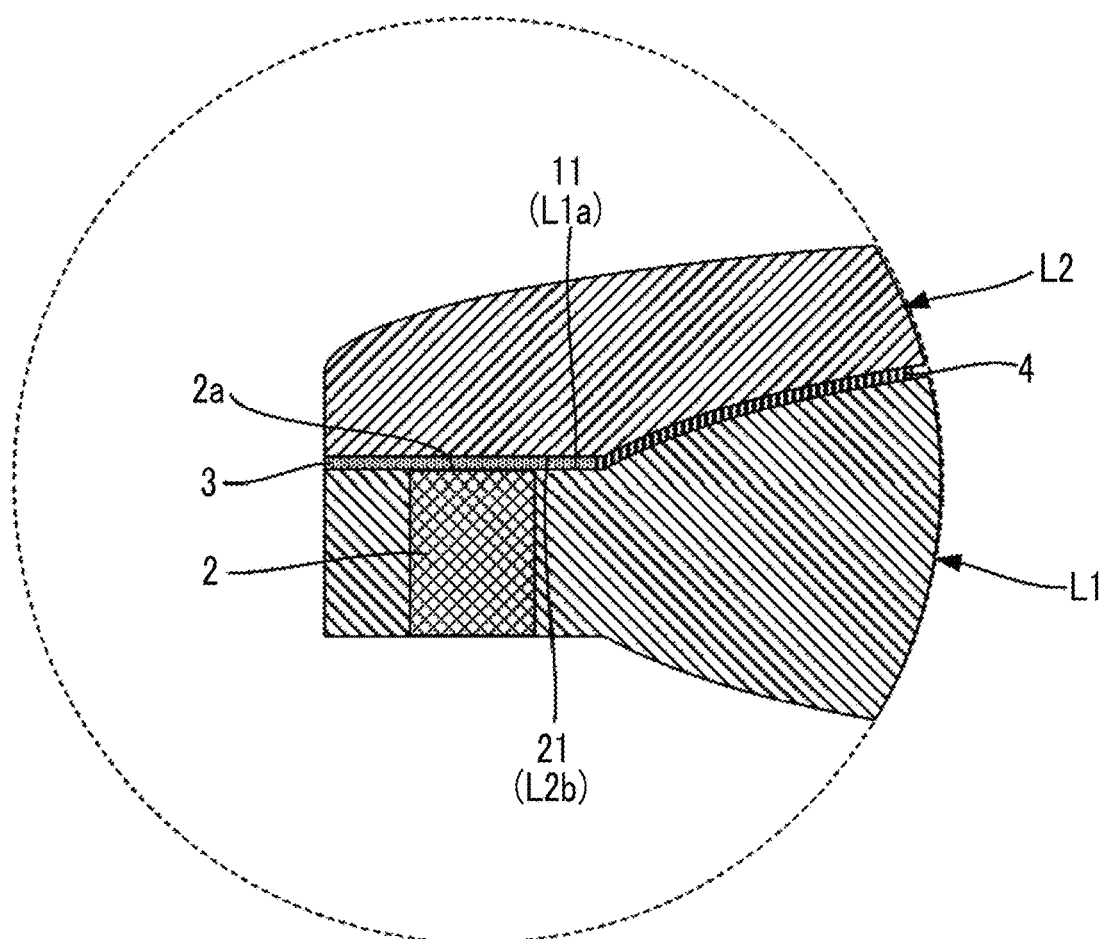
FIG. 2 is an enlarged view showing a portion surrounded by broken line circle II in FIG. 1.
Figure 3:
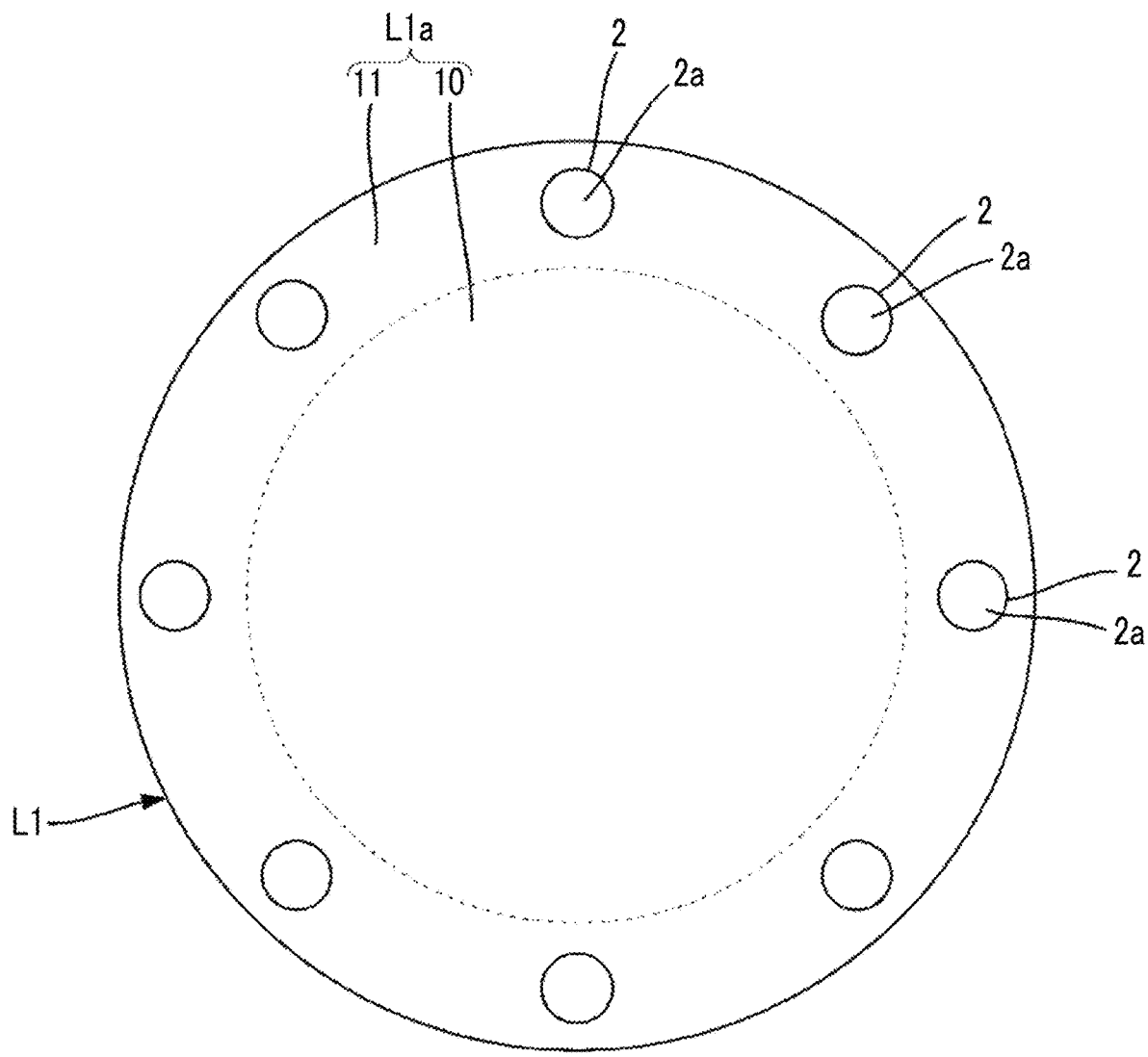
FIG. 3 is a plan view showing a hardly adhesive optical element in the joined optical member of FIG. 1.

FIGS. 1 to 3 show an example of a joined optical member according to an embodiment of the present invention.

The joined optical member 1 shown in FIGS. 1 to 3 includes: a hardly adhesive lens L1 that is formed of a relatively hardly adhesive material; an easily adhesive lens L2 that is formed of a relatively easily adhesive material; and a bonding member 2 that bonds the hardly adhesive lens L1 and the easily adhesive lens L2 to each other.

An optical surface 10 that imparts refractive power to the hardly adhesive lens L1 and an edge surface 11 that surrounds an outer periphery of the optical surface 10 are formed on each of a front surface L1a and a back surface L1b of the hardly adhesive lens L1 perpendicular to an optical axis. The optical surface 10 of each of the front surface L1a and the back surface L1b is formed to be a curved surface such as a convex spherical surface, a concave spherical surface, or a non-spherical surface or to be a flat surface. By combining the above-described surfaces with each other, desired refractive power can be imparted to the hardly adhesive lens L1.

The easily adhesive lens L2 is provided adjacent to the hardly adhesive lens L1 in an optical axis direction. In the example shown in the drawing, the easily adhesive lens L2 is disposed on the front surface L1a side of the hardly adhesive lens L1.

An optical surface 20 that imparts refractive power to the easily adhesive lens L2 is formed on each of a front surface L2a and a back surface L2b of the easily adhesive lens L2 perpendicular to the optical axis. The optical surface 20 of the back surface L2b, which is a facing surface of the easily adhesive lens L2 facing the hardly adhesive lens L1, is formed in a shape substantially matching with the optical surface 10 of the front surface L1a which is a facing surface of the hardly adhesive lens L1 facing the easily adhesive lens L2. In addition, an edge surface 21 is formed on the back surface L2b of the easily adhesive lens L2, the edge surface 21 surrounding an outer periphery of the optical surface 20 and being adjacent to the edge surface 11 of the front surface L1a of the hardly adhesive lens L1.

Examples of the hardly adhesive material forming the hardly adhesive lens L1 include a polyolefin resin. The polyolefin resin has excellent heat resistance and moisture resistance, and thus is desired as an optical resin material. However, the polyolefin resin does not have a polar group such as a hydroxyl group and has extremely low adhesiveness with various adhesives.

The easily adhesive material forming the easily adhesive lens L2 is not particularly limited as long as it has higher adhesiveness with adhesives than the hardly adhesive material forming the hardly adhesive lens L1. For example, the easily adhesive material may be a resin material, for example, a thermoplastic resin such as polymethyl methacrylate (PMMA) or polycarbonate (PC), a thermosetting resin such as epoxy (EP), or a photocurable resin, or may be quartz glass.

The bonding member 2 is embedded in the hardly adhesive lens L1 in a state where it includes an exposed portion 2a exposed to the edge surface (outer peripheral portion) 11 of the surface L1a (the facing surface facing the easily adhesive lens L2) of the hardly adhesive lens L1, and is integrally provided with the hardly adhesive lens L1. In the example shown in the drawing, a plurality of bonding members 2 formed in a cylindrical shape are provided at appropriate intervals in a peripheral direction of the hardly adhesive lens L1. One end surface of each of the bonding members 2 is exposed to the edge surface 11 of the front surface L1a of the hardly adhesive lens L1. The exposed portion 2a is positioned on the same plane of the edge surface 11.

For example, in a state where the bonding member 2 is inserted into a mold for the hardly adhesive lens L1, the hardly adhesive material is injected into the mold, and the hardly adhesive lens L1 is obtained by insert molding. As a result, the hardly adhesive lens L1 and the bonding member 2 are integrated. Alternatively, the bonding member 2 is press-fitted to a hole formed at a position of the hardly adhesive lens L1 where the bonding member 2 is to be provided. As a result, the hardly adhesive lens L1 and the bonding member 2 are integrated.

A material forming the bonding member 2 is not particularly limited as long as it has higher adhesiveness with adhesives than the hardly adhesive material forming the hardly adhesive lens L1. For example, the easily adhesive material may be an optical material such as polymethyl methacrylate, polycarbonate, epoxy, or quartz glass, or may be a non-optical material.

An adhesive 3 is provided between the edge surface 21 of the back surface L2b of the easily adhesive lens L2 and the edge surface 11 of the front surface L1a of the hardly adhesive lens L1 including the exposed portion 2a of the bonding member 2 such that the edge surface 21 of the back surface L2b of the easily adhesive lens L2 adheres to the exposed portion 2a of the bonding member 2 in a state where the optical axis of the hardly adhesive lens L1 matches with the optical axis of the easily adhesive lens L2.

As the adhesive 3, for example, an ultraviolet curable resin such as balsam or an epoxy or acrylate resin can be used. The adhesive 3 can be appropriately selected in consideration of adhesiveness with the easily adhesive lens L2 and the bonding member 2.

The bonding member 2 and the hardly adhesive lens L1 are integrally provided, and the easily adhesive lens L2 adheres to the exposed portion 2a of the bonding member 2 through the adhesive 3. As a result, the hardly adhesive lens L1 and the easily adhesive lens L2 are joined to each other.

The exposed portion 2a of the bonding member 2 to which the easily adhesive lens L2 adheres is disposed on the edge surface (outer peripheral portion) 11 of the front surface L1a, which is the facing surface of the hardly adhesive lens L1 facing the easily adhesive lens L2, and the hardly adhesive lens L1 and the easily adhesive lens L2 are accommodated in the exposed portion 2a. Therefore, a lens barrel for joining the two lenses to each other is not required. As a result, the diameter of the joined optical member 1 can be reduced. In addition, both an outer peripheral surface of the hardly adhesive lens L1 and an outer peripheral surface of the easily adhesive lens L2 are exposed during adhesion, and thus the eccentricities are easily adjusted such that the optical axis of the hardly adhesive lens L1 and the optical axis of the easily adhesive lens L2 match with each other.

From the view point of suppressing unnecessary reflection caused by a gap between the optical surface 10 of the front surface L1a of the hardly adhesive lens L1 and the optical surface 20 of the back surface L2b of the easily adhesive lens L2, it is preferable that the gap between the optical surface 10 of the front surface L1a of the hardly adhesive lens L1 and the optical surface 20 of the back surface L2b of the easily adhesive lens L2 is filled with an optical joining material 4 that allows the optical surface 10 and the optical surface 20 to adhere to each other.

As the optical joining material 4, for example, the same material as the adhesive 3 that allows the edge surface 21 of the back surface L2b of the easily adhesive lens L2 and the exposed portion 2a of the bonding member 2 to adhere to each other can be used. In addition, by the adhesion between the edge surface 21 of the back surface L2b of the easily adhesive lens L2 and the exposed portion 2a of the bonding member 2, the bonding strength between the hardly adhesive lens L1 and the easily adhesive lens L2 is sufficiently secured. As a result, the optical joining material 4 is not necessarily an adhesive, and can be selected from various optical materials in consideration of optical performance.

Figure 4:
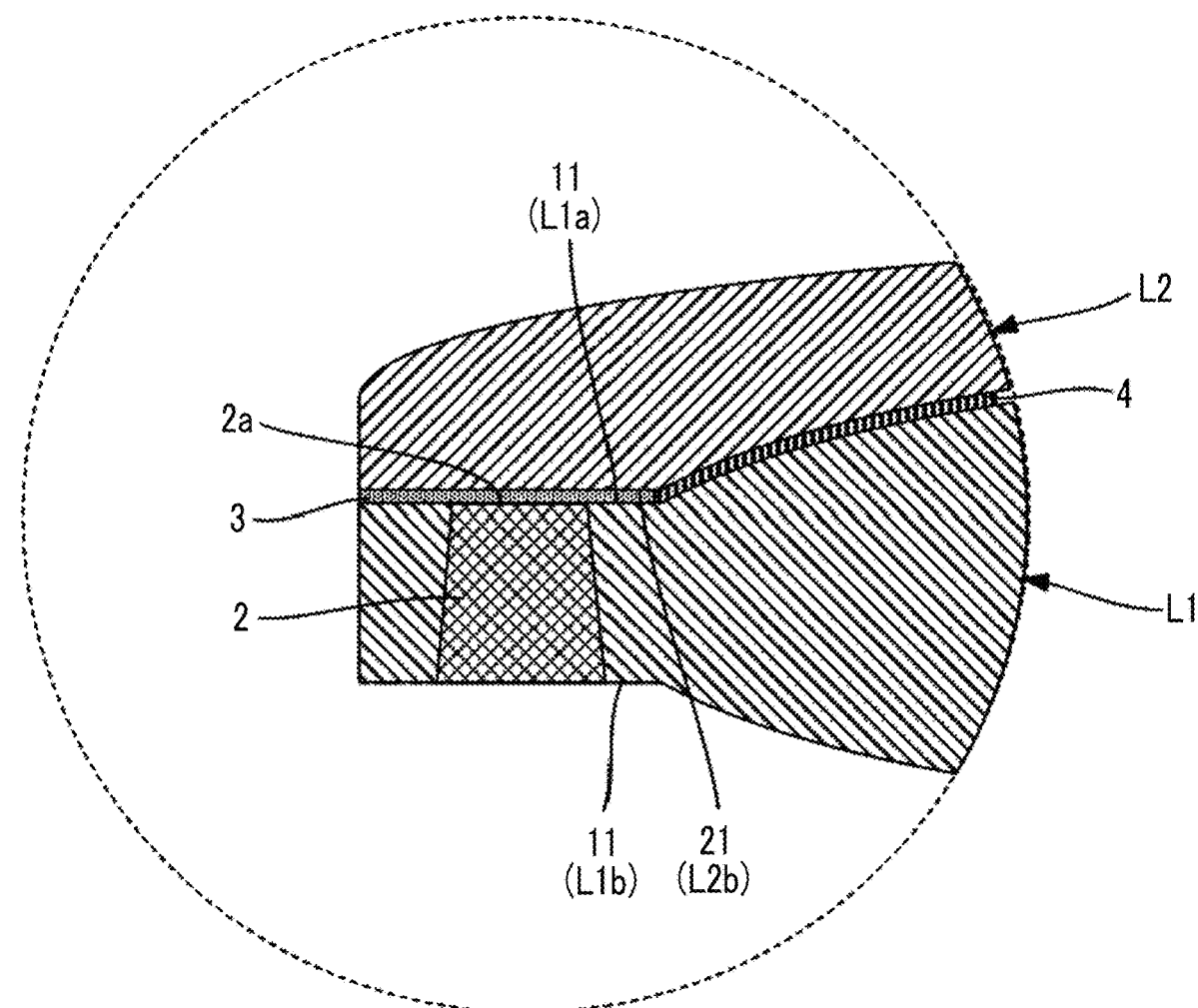
FIG. 4 is a cross-sectional view showing a modification example of a bonding member in the joined optical member of FIG. 1.

FIG. 4 shows a modification example of the bonding member 2.

In the example shown in FIG. 4, a side surface of the bonding member 2 is formed in a tapered shape in which the width increases in a direction from the exposed portion 2a to an end portion opposite to the exposed portion 2a. As a result, the bonding member 2 is prevented from being removed from the hardly adhesive lens L1 to the edge surface 11 side of the front surface L1a of the hardly adhesive lens L1 on which the exposed portion 2a is disposed. By allowing the easily adhesive lens L2 disposed on the front surface L1a side of the hardly adhesive lens L1 to adhere to the exposed portion 2a of the bonding member 2, the bonding strength between the hardly adhesive lens L1 and the easily adhesive lens L2 is further improved.

Figure 5:
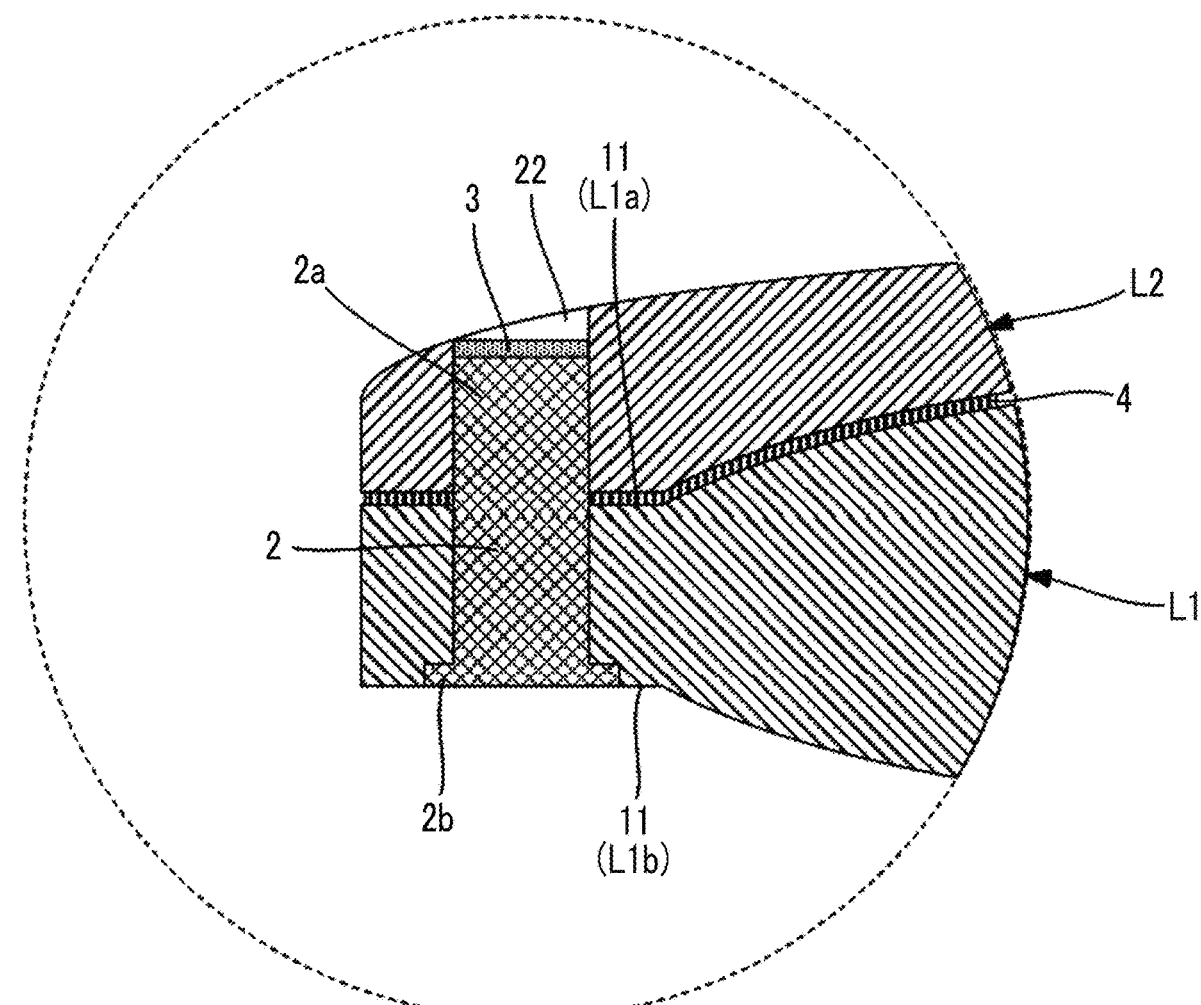
FIG. 5 is a cross-sectional view showing another modification example of the bonding member in the joined optical member of FIG. 1.

FIG. 5 shows another modification example of the bonding member 2.

In the example shown in FIG. 5, the exposed portion 2a of the bonding member 2 is disposed in a state where it protrudes from the edge surface 11 of the front surface L1a of the hardly adhesive lens L1 in the optical axis direction. In an end portion of the bonding member 2 opposite to the exposed portion 2a, a locking portion 2b that engages with the edge surface 11 of the back surface L1b of the hardly adhesive lens L1 is formed such that the bonding member 2 is prevented from being removed from the hardly adhesive lens L1 to the edge surface 11 side of the front surface L1a of the hardly adhesive lens L1. In a case where the hardly adhesive lens L1 and the bonding member 2 are integrated by insert molding, the locking portion 2b may be embedded in the hardly adhesive lens L1. In the easily adhesive lens L2, a positioning hole 22 into which the exposed portion 2a of the bonding member 2 is inserted is formed. In the positioning hole 22, the exposed portion 2a of the bonding member 2 adheres to the easily adhesive lens L2 through the adhesive 3. The position of the easily adhesive lens L2 is determined by the exposed portion 2a of the bonding member 2, and the eccentricities are more easily adjusted such that the optical axis of the hardly adhesive lens L1 and the optical axis of the easily adhesive lens L2 match with each other.

Figure 6:
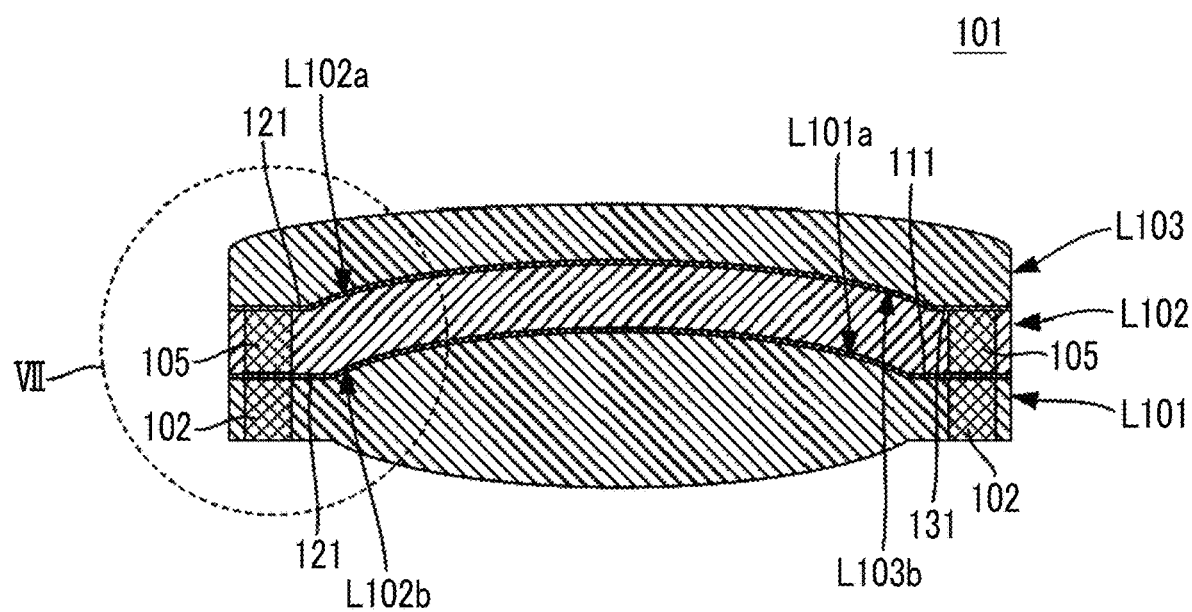
FIG. 6 is a cross-sectional view showing another example of the joined optical member according to the embodiment of the present invention.
Figure 7:
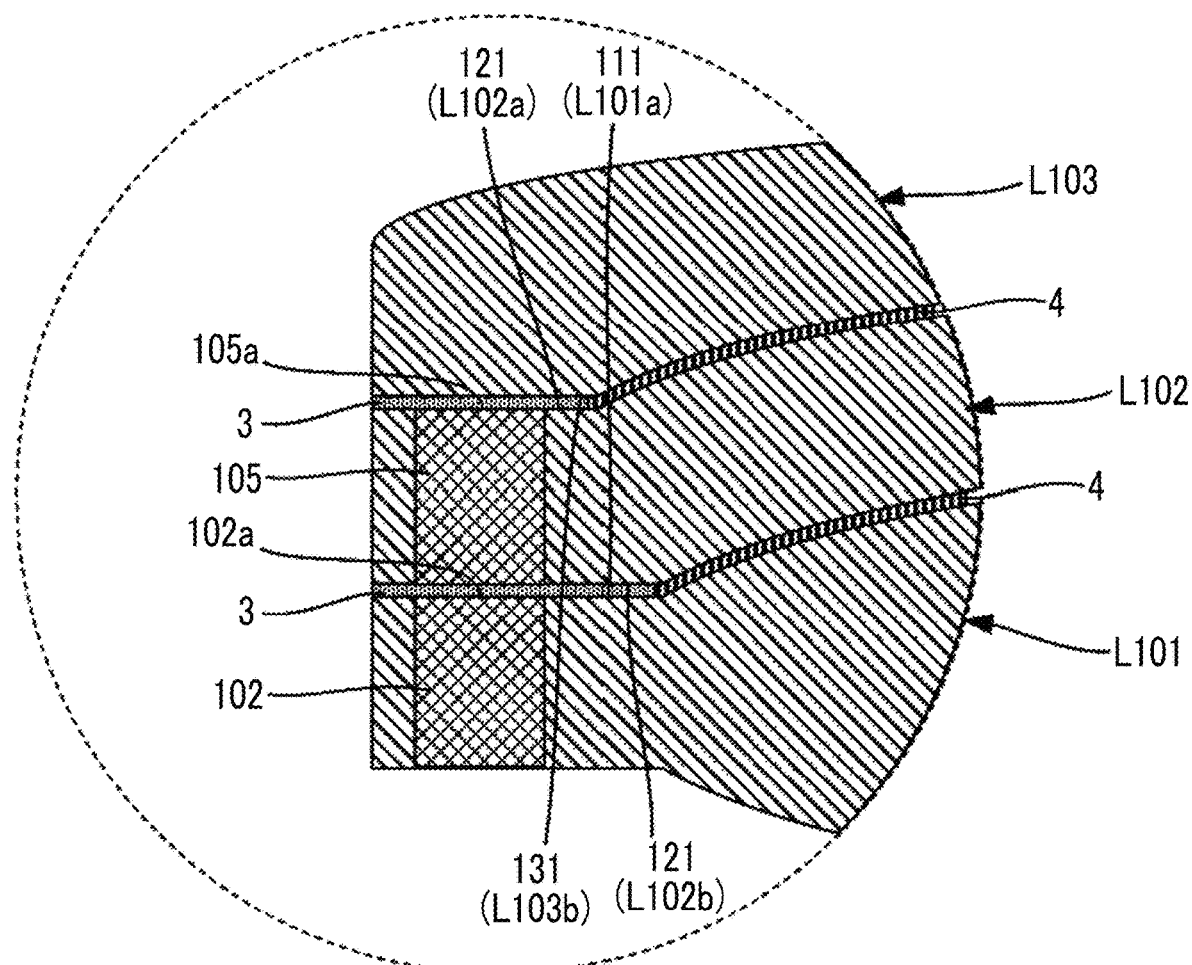
FIG. 7 is an enlarged view showing a portion surrounded by broken line circle VII in FIG. 6.

FIGS. 6 and 7 show another example of the joined optical member according to the embodiment of the present invention.

A joined optical member 101 shown in FIGS. 6 and 7 includes: a first lens L101; a second lens L102 that is formed of an easily adhesive material having higher adhesion than a material forming the first lens L101; and a third lens L103 that is formed of an easily adhesive material having higher adhesion than a material forming the second lens L102, in which the first lens L101, the second lens L102, and the third lens L103 are provided adjacent to each other in this order in the optical axis direction.

The joined optical member 101 further includes: a plurality of bonding members 102 that join the first lens L101 and the second lens L102 to each other; and a plurality of bonding members 105 that join the second lens L102 and the third lens L103 to each other.

The bonding member 102 is embedded in the first lens L101 in a state where it includes an exposed portion 102a exposed to an edge surface 111 of a front surface L101a of the first lens L101, and is integrally provided with the first lens L101. The exposed portion 102a is positioned on the same plane of the edge surface 111.

The bonding member 105 is embedded in the second lens L102 in a state where it includes an exposed portion 105a exposed to an edge surface 121 of a front surface L102a of the second lens L102, and is integrally provided with the second lens L102. The exposed portion 105a is positioned on the same plane of the edge surface 121.

The adhesive 3 is provided between the edge surface 121 of the back surface L102b of the second lens L102 and the edge surface 111 of the front surface L101a of the first lens L101 including the exposed portion 102a of the bonding member 102 such that the edge surface 121 of the back surface L102b of the second lens L102 adheres to the exposed portion 102a of the bonding member 102 in a state where the optical axis of the first lens L101 matches with the optical axis of the second lens L102.

In addition, the adhesive 3 is provided between the edge surface 131 of the back surface L103b of the third lens L103 and the edge surface 121 of the front surface L102a of the second lens L102 including the exposed portion 105a of the bonding member 105 such that the edge surface 131 of the back surface L103b of the third lens L103 adheres to the exposed portion 105a of the bonding member 105 in a state where the optical axis of the second lens L102 matches with the optical axis of the third lens L103.

By allowing the second lens L102 to adhere to the exposed portion 102a of the bonding member 102 that is integrally provided with the first lens L101, the first lens L101 and the second lens L102 are joined to each other. By allowing the third lens L103 to adhere to the exposed portion 105a of the bonding member 105 that is integrally provided with the second lens L102, the second lens L102 and the third lens L103 are joined to each other.

The exposed portion 102a of the bonding member 102 to which the second lens L102 adheres is disposed on the edge surface (outer peripheral portion) 111 of the front surface L101a which is a facing surface of the first lens L101 facing the second lens L102. The exposed portion 105a of the bonding member 105 to which the third lens L103 adheres is disposed on the edge surface (outer peripheral portion) 121 of the front surface L102a which is a facing surface of the second lens L102 facing the third lens L103. The first lens L101, the second lens L102, and the third lens L103 are accommodated in the exposed portions 102a and 105a. Therefore, a lens barrel for joining the three lenses to each other is not required. As a result, the diameter of the joined optical member 101 can be reduced. In addition, all of an outer peripheral surface of the first lens L101, an outer peripheral surface of the second lens L102, and an outer peripheral surface of the third lens L103 are exposed during adhesion, and thus the eccentricities are easily adjusted such that the optical axis of the first lens L101, the optical axis of the second lens L102, and the optical axis of the third lens L103 match with each other. In particular, since the outer peripheral surface of the second lens L102 interposed between the first lens L101 and the third lens L103 is also exposed, the eccentricities can also be adjusted by displacing the second lens L102. Therefore, the eccentricities can be more easily adjusted.

The tapered shape of the bonding member 2 shown in FIG. 4 and the configuration of the locking portion 2b of the bonding member 2 shown in FIG. 5 may be applied to the bonding member 102 and the bonding member 105 of the joined optical member 101, respectively, such that the removal of the bonding member 102 from the first lens L101 can be prevented and the removal of the bonding member 105 from the second lens L102 can be prevented.

In addition, the following configuration may be adopted in which: the bonding member 105 is formed next to the bonding member 102; the exposed portion 102a of the bonding member 102 formed next to the bonding member 105 is disposed in a state where it protrudes from the edge surface 111 of the front surface L101a of the first lens L101 in the optical axis direction; a positioning hole into which the exposed portion 102a disposed in the protrusion state is to be inserted is formed in the second lens L102 and the third lens L103; and the positions of the second lens L102 and the third lens L103 are determined by the exposed portion 102a of the bonding member 102. In this case, the exposed portion 102a of the bonding member 102 adheres to the third lens L103 through the adhesive 3 in the positioning hole of the third lens L103, the second lens L102 is interposed between the first lens L101 and the third lens L103, and thus the first lens L101, the second lens L102, and the third lens L103 are joined to each other.

Figure 8:
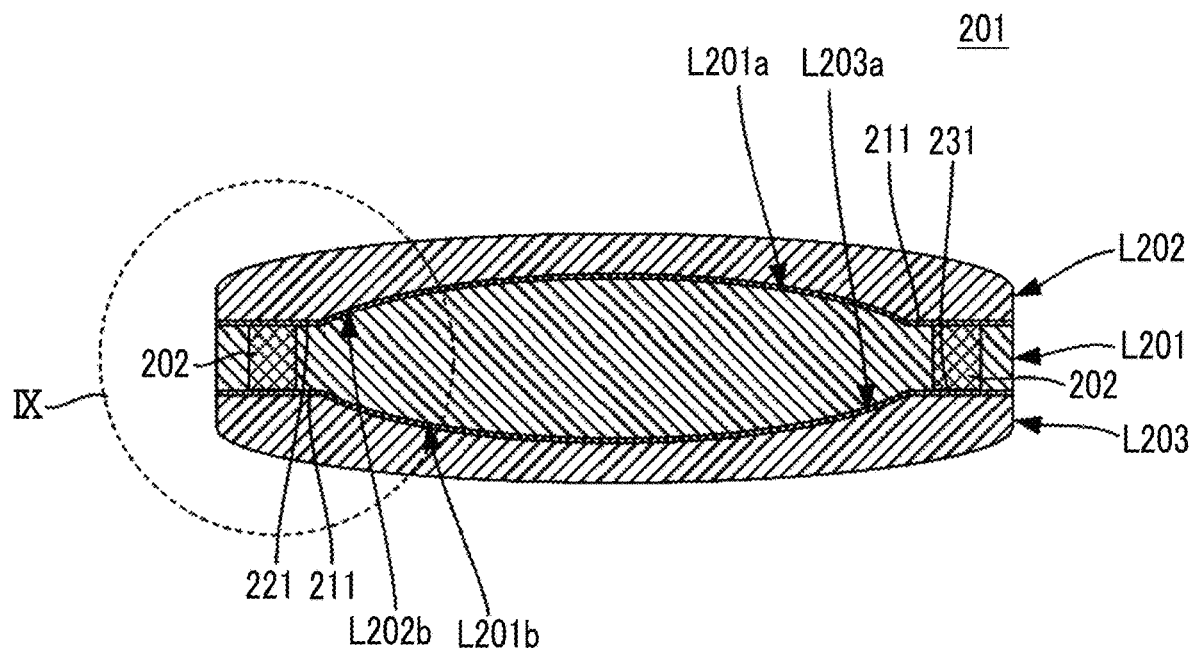
FIG. 8 is a cross-sectional view showing still another example of the joined optical member according to the embodiment of the present invention.
Figure 9:
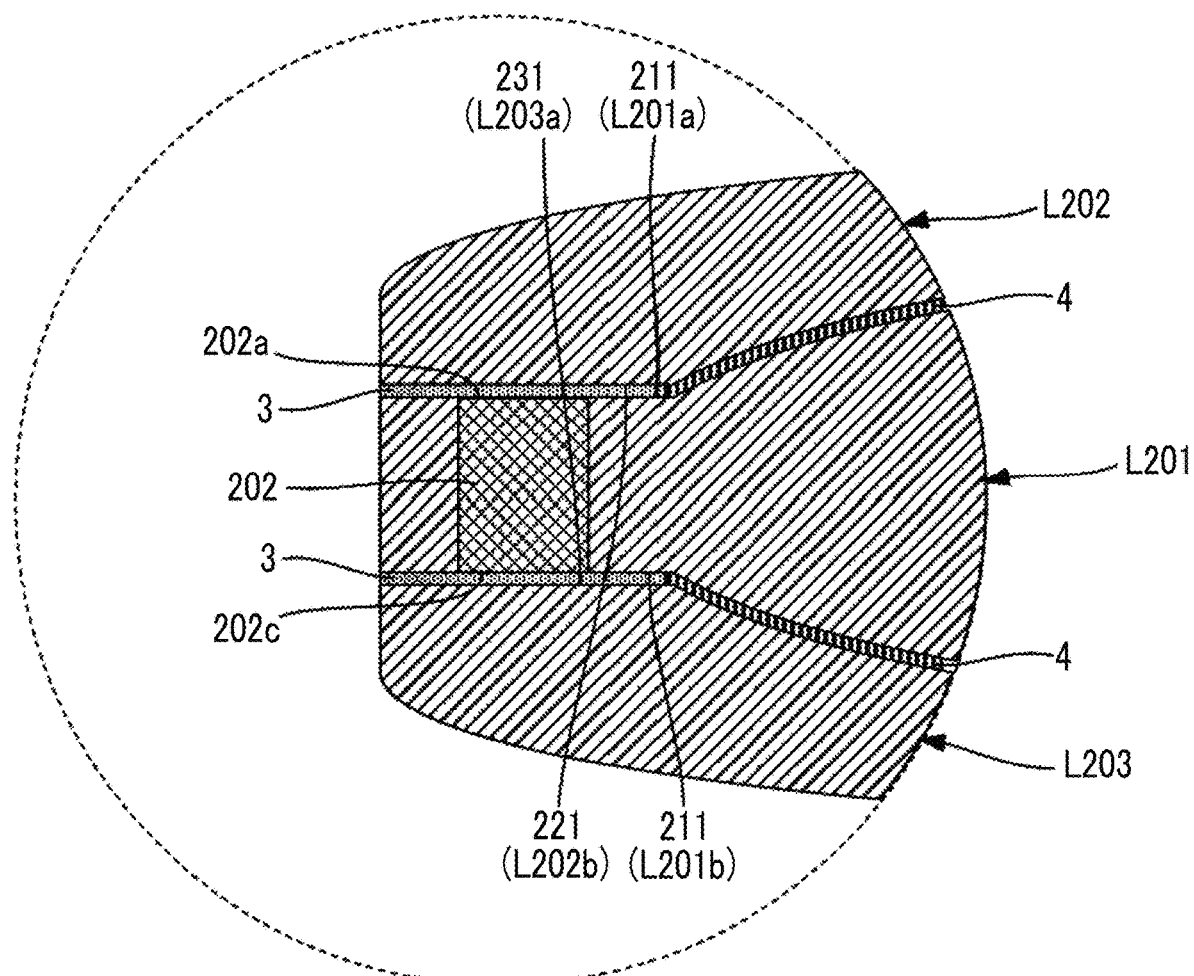
FIG. 9 is an enlarged view showing a portion surrounded by broken line circle IX in FIG. 8.

FIGS. 8 and 9 show still another example of the joined optical member according to the embodiment of the present invention.

A joined optical member 201 shown in FIGS. 8 and 9 includes: a first lens L201; a second lens L202 that is formed of an easily adhesive material having higher adhesion than a material forming the first lens L201; and a third lens L203 that is formed of an easily adhesive material having higher adhesion than the material forming the first lens L201, in which the second lens L202 is provided adjacent to a front surface L201a side of the first lens L201, and the third lens L203 is provided adjacent to a back surface L201b side of the first lens L201.

The joined optical member 201 further includes a plurality of bonding members 202 that join the first lens L201 and the second lens L202 to each other and join the first lens L201 and the third lens L203 to each other.

The bonding member 202 is embedded in the first lens L201 in a state where it includes an exposed portion 202a exposed to an edge surface 211 of the front surface L201a of the first lens L201 and an exposed portion 202c exposed to an edge surface 211 of the back surface L201b of the first lens L201, and is integrally provided with the first lens L201. The exposed portion 202a is positioned on the same plane of the edge surface 211 of the front surface L201a, and the exposed portion 202c is positioned on the same plane of the edge surface 211 of the back surface L201b.

The adhesive 3 is provided between the edge surface 221 of the back surface L202b of the second lens L202 and the edge surface 211 of the front surface L201a of the first lens L201 including the exposed portion 202a of the bonding member 202 such that the edge surface 221 of the back surface L202b of the second lens L202 adheres to the exposed portion 202a of the bonding member 202 in a state where the optical axis of the first lens L201 matches with the optical axis of the second lens L202.

In addition, the adhesive 3 is provided between the edge surface 231 of the front surface L203a of the third lens L203 and the edge surface 211 of the back surface L201b of the first lens L201 including the exposed portion 202c of the bonding member 202 such that the edge surface 231 of the front surface L203a of the third lens L203 adheres to the exposed portion 202c of the bonding member 202 in a state where the optical axis of the first lens L201 matches with the optical axis of the third lens L203.

By allowing the second lens L202 to adhere to the exposed portion 202a of the bonding member 202 that is integrally provided with the first lens L201, the first lens L201 and the second lens L202 are joined to each other. By allowing the third lens L203 to adhere to the exposed portion 202c of the bonding member 202 that is integrally provided with the first lens L201, the first lens L201 and the third lens L203 are joined to each other.

The exposed portion 202a of the bonding member 202 to which the second lens L202 adheres is disposed on the edge surface (outer peripheral portion) 211 of the front surface L201a which is a facing surface of the first lens L201 facing the second lens L202. The exposed portion 202c of the bonding member 202 to which the third lens L203 adheres is disposed on the edge surface (outer peripheral portion) 211 of the back surface L201b which is a facing surface of the first lens L201 facing the third lens L203. The first lens L201, the second lens L202, and the third lens L203 are accommodated in the exposed portions 202a and 202c. Therefore, a lens barrel for joining the three lenses to each other is not required. As a result, the diameter of the joined optical member 201 can be reduced. In addition, all of an outer peripheral surface of the first lens L201, an outer peripheral surface of the second lens L202, and an outer peripheral surface of the third lens L203 are exposed during adhesion, and thus the eccentricities are easily adjusted such that the optical axis of the first lens L201, the optical axis of the second lens L202, and the optical axis of the third lens L203 match with each other. In particular, since the outer peripheral surface of the first lens L201 interposed between the second lens L202 and the third lens L203 is also exposed, the eccentricities can also be adjusted by displacing the first lens L201. Therefore, the eccentricities can be more easily adjusted.

The tapered shape of the bonding member 2 shown in FIG. 4 and the configuration of the locking portion 2b of the bonding member 2 shown in FIG. 5 may be applied to the bonding member 202 of the joined optical member 201 such that the removal of the bonding member 202 from the first lens L201 can be prevented.

In addition, the following configuration may be adopted in which: the exposed portion 202a of the bonding member 202 is disposed in a state where it protrudes from the edge surface 211 of the front surface L201a of the first lens L201 in the optical axis direction; a positioning hole into which the exposed portion 202a of the bonding member 202 is to be inserted is formed in the second lens L202; and the position of the second lens L202 is determined by the exposed portion 202a of the bonding member 202. In addition, the following configuration may be adopted in which: the exposed portion 202c of the bonding member 202 is disposed in a state where it protrudes from the edge surface 211 of the back surface L201b of the first lens L201 in the optical axis direction; a positioning hole into which the exposed portion 202c of the bonding member 202 is to be inserted is formed in the third lens L203; and the position of the third lens L203 is determined by the exposed portion 202c of the bonding member 202. In this case, the exposed portion 202a of the bonding member 202 adheres to the second lens L202 through the adhesive 3 in the positioning hole of the second lens L202, the exposed portion 202c of the bonding member 202 adheres to the third lens L203 through the adhesive 3 in the positioning hole of the third lens L203, and thus the first lens L201, the second lens L202, and the third lens L203 adhere to each other.

Hereinabove, the present invention has been described by using the joined optical member in which a plurality of lenses are joined to each other as an example. However, optical elements constituting the joined optical member are not limited to lenses and may be, for example, a prism or a filter.

As described above, the joined optical member disclosed in this specification comprises: a hardly adhesive optical element that is formed of a relatively hardly adhesive material; an easily adhesive optical element that is formed of a relatively easily adhesive material and is provided parallel to the hardly adhesive optical element in an optical axis direction; a bonding member that includes an exposed portion and is embedded in the hardly adhesive optical element, the exposed portion being exposed to an outer peripheral portion of a facing surface of the hardly adhesive optical element that faces the easily adhesive optical element; and an adhesive that allows the easily adhesive optical element and the exposed portion of the bonding member to adhere to each other.

In addition, the joined optical member disclosed in this specification further comprises an optical joining material that fills a gap between the easily adhesive optical element and a center portion of the facing surface of the hardly adhesive optical element that is surrounded by the outer peripheral portion.

In addition, in the joined optical member disclosed in this specification, the optical joining material is different from the adhesive.

In addition, in the joined optical member disclosed in this specification, the hardly adhesive material is a polyolefin resin.

In addition, in the joined optical member disclosed in this specification, a side surface of the bonding member has a tapered shape in which a width increases in a direction away from the exposed portion.

In addition, in the joined optical member disclosed in this specification, the hardly adhesive optical element is an insert molded article that is integrally molded with the bonding member.

INDUSTRIAL APPLICABILITY

The present invention can be used in various joined optical members in which a hardly adhesive optical element and an easily adhesive optical element are joined to each other, the hardly adhesive optical element being formed of a relatively hardly adhesive material, and the easily adhesive optical element being formed of a relatively easily adhesive material and being provided parallel to the hardly adhesive optical element in an optical axis direction.

Hereinabove, the embodiment of the present invention has been described but is merely exemplary. Various modifications can be made within a range not departing from the scope of the present invention.

What is claimed is:

1. A joined optical member comprising:
a first optical element that is formed of a polyolefin resin;
a second optical element that is formed of a material selected from a group consisting of polymethyl methacrylate, polycarbonate, a thermosetting resin, a photocurable resin, and quartz glass, and is provided next to the first optical element in an optical axis direction;
a bonding member that includes an exposed portion and is embedded in the first optical element, the exposed portion being exposed to an outer peripheral portion of a facing surface of the first optical element that faces the second optical element in the optical axis direction; and
an adhesive that allows the second optical element and the exposed portion of the bonding member to adhere to each other.

2. The joined optical member according to claim 1, further comprising:
an optical joining material that fills a gap between the second optical element and a center portion of the facing surface of the first optical element that is surrounded by the outer peripheral portion.

3. The joined optical member according to claim 2, wherein the optical joining material is different from the adhesive.

4. The joined optical member according to claim 1, wherein a side surface of the bonding member has a tapered shape in which a width increases in the optical axis direction away from the exposed portion.

5. The joined optical member according to claim 1, the first optical element is an insert molded article that is integrally molded with the bonding member.

6. A joined optical member comprising:
a first optical element that is formed of a polyolefin resin;
a second optical element that is formed of a material selected from a group consisting of polymethyl methacrylate, polycarbonate, a thermosetting resin, a photocurable resin, and quartz glass, and is provided next to the first optical element in an optical axis direction;
a bonding member that includes an exposed portion and is embedded in the first optical element, the exposed portion being exposed to an outer peripheral portion of a facing surface of the first optical element that faces the second optical element; and
an adhesive that allows the second optical element and the exposed portion of the bonding member to adhere to each other,
wherein the facing surface of the first optical element comprises an optical surface that imparts refractive power to the first optical element and an edge surface that surrounds an outer periphery of the optical surface, and
the bonding member is embedded at the edge surface and not embedded at the optical surface.

7. The joined optical member according to claim 6, wherein the exposed portion is disposed at the edge surface.

8. A joined optical member comprising:
a first optical element that is formed of a polyolefin resin;
a second optical element that is formed of a material selected from a group consisting of polymethyl methacrylate, polycarbonate, a thermosetting resin, a photocurable resin, and quartz glass, and is provided next to the first optical element in an optical axis direction;
a bonding member that includes an exposed portion and is embedded in the first optical element, the exposed portion being exposed to an outer peripheral portion of a facing surface of the first optical element that faces the second optical element; and
an adhesive that allows the second optical element and the exposed portion of the bonding member to adhere to each other,
wherein the facing surface of the first optical element comprises a first optical surface that imparts refractive power to the first optical element and a first edge surface that surrounds an outer periphery of the first optical surface,
a facing surface of the second optical element facing to the first optical element comprises a second optical surface that imparts refractive power to the second optical element and a second edge surface that surrounds an outer periphery of the second optical surface, and
the adhesive allows the second edge surface to adhere to the first edge surface and the exposed portion.

9. A joined optical member comprising:
a first optical element that is formed of a polyolefin resin;
a second optical element that is formed of a material selected from a group consisting of polymethyl methacrylate, polycarbonate, a thermosetting resin, a photocurable resin, and quartz glass, and is provided next to the first optical element in an optical axis direction;
a bonding member that includes an exposed portion and is embedded in the first optical element, the exposed portion being exposed to an outer peripheral portion of a facing surface of the first optical element that faces the second optical element; and
an adhesive that allows the second optical element and the exposed portion of the bonding member to adhere to each other,
wherein the bonding member is not embedded in the second optical element.

* * * * *